G. A. LAMBERT.
FRICTION POWER MECHANISM.
APPLICATION FILED FEB. 5, 1912.
1,128,794.
Patented Feb. 16, 1915.
2 SHEETS—SHEET 1.
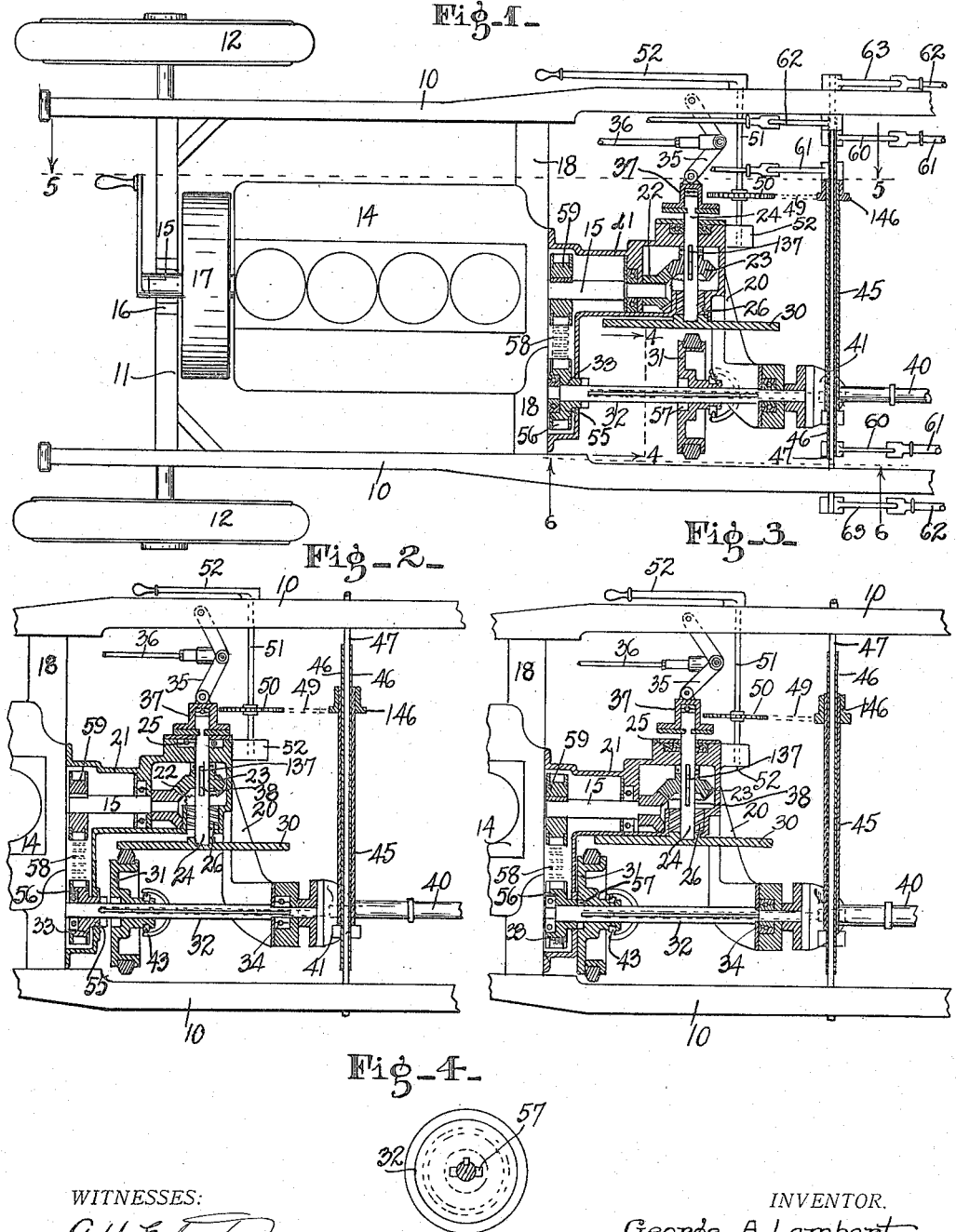
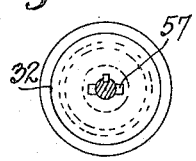
WITNESSES:
A H Edgerton
O. M. McLaughlin
INVENTOR.
George A. Lambert.
BY
V. H. Lockwood
ATTORNEY.

G. A. LAMBERT.
FRICTION POWER MECHANISM.
APPLICATION FILED FEB. 5, 1912.
1,128,794.
Patented Feb. 16, 1915.
2 SHEETS—SHEET 2.
Fig-5-
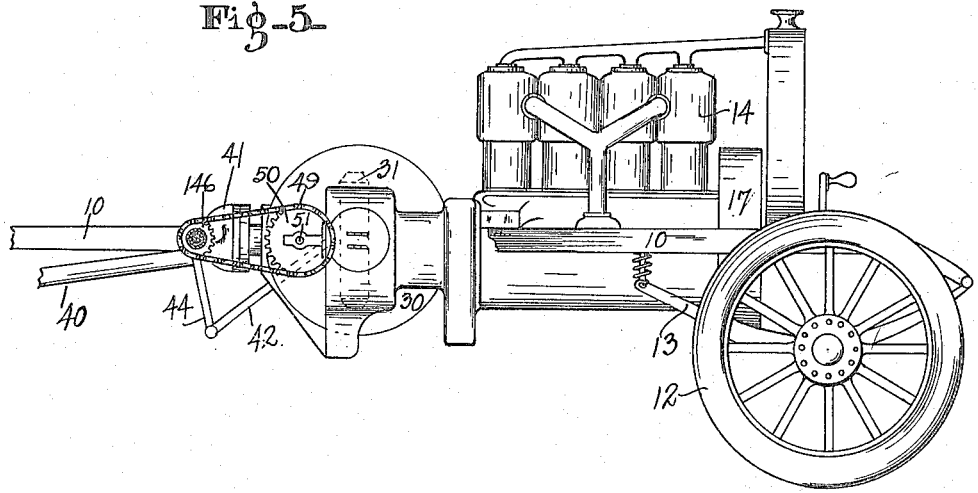
Fig-6-
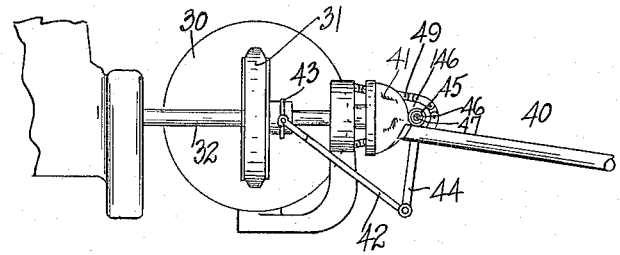
WITNESSES:
A H Edgerton
O. W. McLaughlin
INVENTOR.
George A. Lambert.
BY
T. H. Lockwood
ATTORNEY.

UNITED STATES PATENT OFFICE.

GEORGE A. LAMBERT, OF ANDERSON, INDIANA.

FRICTION POWER MECHANISM.

1,128,794.　　　　Specification of Letters Patent.　　Patented Feb. 16, 1915.

Application filed February 5, 1912.　Serial No. 675,625.

*To all whom it may concern:*

Be it known that I, GEORGE A. LAMBERT, a citizen of the United States, and a resident of Anderson, county of Madison, and State of Indiana, have invented a certain useful Friction Power Mechanism; and I do hereby declare that the following is a full, clear, and exact description thereof, reference being had to the accompanying drawings.

The object of this invention is to improve the construction of friction driven automobiles.

The friction driven automobiles built heretofore, at least those of the most common type, have given trouble by reason of the torsional stress on the friction disk shaft and the consequent strains on the joints, bearings and frame parts, because the friction members or disks engage each other at right angles and under considerable pressure, when in actual use, and the spur wheel or member engages the side face of the other friction member at some distance from the axis thereof, and particularly during reasonable or high speed.

This invention is intended to overcome the above difficulty.

Another trouble with the usual type of the friction transmission in such automobiles, is that there is no fixed relation between the bearings of the two friction members or disks, or their shafts, whereas in my improvement these parts are mounted on or in connection with the same on a single frame instead of on separate parts of the chassis.

Another object of the invention is to combine with the friction drive, a direct high speed drive which involves one of the friction elements but not the other, so that when desired said direct high speed drive can be used, particularly for high speed, and, therefore, relieve the friction drive mechanism. In other words, the arrangement is such that either can be used as desired.

The nature of the invention will be understood from the accompanying drawings and the following description and claims.

In the drawings, Figure 1 is a plan view of the forward part of the chassis of an automobile including my invention, parts thereof being shown in horizontal section and with the friction transmission mechanism in idle position. Fig. 2 shows the right hand end of Fig. 1 with the friction transmission in position to operate at high speed. Fig. 3 is the same with the friction transmission not operating at all, but with the direct high speed drive in operation. Fig. 4 is a section on the line 4—4 of Fig. 1. Fig. 5 is a section on the line 5—5 of Fig. 1. Fig. 6 is a section on the line 6—6 of Fig. 1.

There is shown a chassis frame with side bars 10 and a front cross bar 11, also front wheels 12, springs 13 and engine 14. The engine shaft or crank shaft 15 is mounted in boxing 16 on the front cross bar 11. The fly wheel 17 is between the front cross bar 11 of the frame and the engine 14. The rear part of the engine frame is integral with two laterally extending arms 18 which project out to the chassis frame and are secured thereon. These arms 18 are integral with the engine frame. A frame 20 extends rearwardly from the engine frame, projecting beyond and overhanging the supporting arms 18, and this frame 20 carries the transmission mechanism. Therefore, the engine and transmission mechanism is a single unit carried by or in connection with a single frame supported by the chassis frame at three points, at the middle of the front cross bar 11 and at a point about midway of each side bar of the chassis frame. This makes a power unit completely mounted on a single rigid frame, so that there is no relative play between the parts of the frame or the parts of the engine and transmission mechanism which are mounted on the portions of the frame.

The engine shaft extends rearward beyond the engine through a bar 21 on a portion of the frame 20, and at its extreme end carries a bevel gear 22, which meshes with a bevel gear 23 on a transverse shaft 24 which is mounted in bearings 25 and 26 in the frame 20. The shaft 24 at one end carries the driving friction disk 30, the two being secured together so that the side face of said disk 30 will extend longitudinally of the machine, instead of transversely thereof, as heretofore.

The driven disk 31, or fiber wheel, as it is usually called, is disposed at a right angle to the disk 30 and is slidably mounted on the shaft 32, which extends longitudinally of the machine and has bearings 33 and 34 near each end. The fiber wheel 31 has a fibrous periphery, which is engaged by the driving disk 30 when the shaft 24 of the latter disk is moved longitudinally from the position shown in Fig. 1 to that shown in Fig. 2. The driving disk 30 is moved and forced against the fiber wheel 31 by the toggle 35, which is actuated through the rods 36 by pedal mechanism of the usual type and which is not here shown. One member of the toggle 36 is pivoted to a side bar of the chassis frame, and the other member is pivoted to a sleeve or nut 37 secured on the end of the shaft 24. The bevel gear wheel 23 is slidable on the shaft 24 and is keyed thereto by a key 137 which projects through a slot 38 in the shaft 24. The frame in which the shaft 24 is mounted serves to limit the movement of the bevel gear 23 in one direction, and the bevel gear 22 tends to limit its movement in the other direction.

Power transmitted to the shaft 32 on which the fiber wheel is mounted goes to the rear wheels through the shaft 40, which is connected with the shaft 32 by the universal joint 41. The fiber wheel 31 is slipped on its shaft 32 in order to change speeds of the friction transmission mechanism by the rod 42, see Fig. 6, which has a yoke at one end engaging the collar 43, or the hub of the fiber wheel 31, and at the other end it is pivoted to a crank arm 44 extending downwardly from a tubular shaft or sleeve 45, which is mounted on the tubular shaft 46 within it, which in turn is mounted on the transverse shaft 47 secured to the side bars of the frame. A sprocket wheel 146 is secured on the outer tubular shaft 45, and a chain 49 runs from it to a sprocket wheel 50 on the shaft 51, which has bearings in the frame 20, and also bearings in the underside of the chassis frame and outside of the chassis frame there is a hand-lever 52 secured to the shaft 51 for actuating it. With this means the fiber wheel is adjusted for changes of speed and also for changing the transmission mechanism from a friction transmission to a direct drive on high speed. This last is accomplished by forcing the fiber wheel beyond the periphery of the friction disk 30 and into engagement with the hub 55 of a sprocket wheel 56 mounted loosely on the shaft 32. There is a projection from the hub 55 adapted to enter corresponding sockets 57 in the fiber wheel 31 so that power can be transmitted from the sprocket wheel 56 to the fiber wheel and from the fiber wheel 31 to the shaft 32 directly. The sprocket wheel 56 is driven by the sprocket chain 58 and the sprocket wheel 59 on the engine shaft 15. This gives a powerful transmission and transmits it directly to the shaft 32 without any chance for slippage and is geared high to adapt it for direct drive on high speed. It is observed that the same means which is used for varying the speed of the friction transmission also converts the transmission mechanism from a friction drive to a direct drive and back again.

Suitable brake rods 60 are connected with the tubular shaft 46 and are actuated by a rod 61 which is operated by a brake pedal, not shown. There is also a rod 62 operated by a brake pedal which is secured on the shaft 47 with which the emergency brake rod 63 is connected.

I claim as my invention:

1. An automobile including an engine, an engine shaft longitudinal of the automobile, a driving friction disk longitudinal of the automobile, a shaft for said disk transversely of said automobile and driven by the engine shaft, a driven shaft longitudinal of the automobile, a driven friction wheel slidably keyed on said driven shaft, means for sliding said driven friction wheel on its shaft to change speed, a toggle pivotally connected at one end with the frame of the automobile and at the other end with the shaft of the driving disk, and pedal means for actuating said toggle for forcing the driving disk against the driven wheel.

2. An automobile including an engine, an engine shaft longitudinal of the automobile, a bevel gear on the end thereof, a driving friction disk longitudinal of the automobile, a shaft for said disk transversely of the automobile and driven by said engine shaft, a bevel gear slidably mounted on said shaft and which meshes with said first-mentioned bevel gear, a driven shaft longitudinal of the automobile, a driven friction wheel slidably keyed on said driven shaft, means for sliding said driven friction wheel on its shaft to change speed, and means for transversely moving the shaft of the driving disk for forcing the latter into engagement with the driven wheel.

3. An automobile including an engine, an engine shaft longitudinal of the automobile, a bevel gear on the end thereof, a driving friction disk longitudinal of the automobile and on one side of the engine shaft, a shaft for said disk transversely of the automobile and extending to the other side of the engine shaft, a bevel gear slidably mounted on said shaft and which meshes with said first-mentioned bevel gear and on the opposite side of the engine shaft from said driving disk, a driven shaft longitudinal of the automobile, a driven friction wheel slidably keyed on said driven shaft, means for sliding said driven friction wheel on its shaft to change speed, and means for forcing the shaft of the driving disk toward the driven wheel.

4. An automobile including an engine, an engine shaft, a friction disk driven by said engine shaft, a driven shaft, a driven wheel slidably keyed on said shaft and its periphery adapted to engage and be moved across the side face of the driving disk, means for causing engagement and disengagement between the driving disk and driven wheel, a gear loosely mounted on said driven shaft and adapted to be locked with the driven wheel, means for moving said driven disk, a spur gear on the engine shaft, and means for driving the gear on the driven shaft directly from the gear on the engine shaft.

5. An automobile including an engine, an engine shaft longitudinal of the automobile, a driving friction disk longitudinal of the automobile, a shaft for said disk transversely of the automobile and driven by the engine shaft, a driven shaft longitudinal of the automobile, a driven friction wheel slidably keyed on said driven shaft and with its periphery adapted to be engaged by the side face of the driving disk, means for causing engagement and disengagement between said driving disk and driven wheel, a spur gear on the engine shaft, and a spur gear driven from the spur gear on the engine shaft and loosely mounted on the driven shaft in position to be engaged by the driven friction wheel.

6. An automobile including a frame, an engine shaft mounted on said frame, a driving friction disk mounted on the same frame and adapted to be driven by the engine shaft, a driven shaft, a friction wheel slidable thereon into and out of engagement with the driving disk and a direct driving means between said engine shaft and said driven shaft adapted to be locked in engagement with the driven shaft by said friction wheel when moved out of engagement with the driving disk.

In witness whereof, I have hereunto affixed my signature in the presence of the witnesses herein named.

GEORGE A. LAMBERT.

Witnesses:
H. L. WOODRUFF,
JEANNETTE ZWICKEL.

Copies of this patent may be obtained for five cents each, by addressing the "Commissioner of Patents, Washington, D. C."